United States Patent [19]

Shinoda et al.

[11] 4,405,924
[45] Sep. 20, 1983

[54] REMOTE CONTROL SWITCH APPARATUS FOR AUTOMOBILES

[75] Inventors: Yoshio Shinoda, Aichi; Akira Kuno, Oobu, both of Japan

[73] Assignee: Nippon Soken, Inc., Nishio, Japan

[21] Appl. No.: 245,208

[22] Filed: Mar. 18, 1981

[30] Foreign Application Priority Data

Mar. 21, 1980 [JP] Japan .................................. 55-37789

[51] Int. Cl.³ .............................................. G08C 19/00
[52] U.S. Cl. ........................ 340/825.72; 340/825.73;
340/825.76; 340/32; 340/384 E; 367/137;
307/10 R; 455/603; 358/194.1; 181/114
[58] Field of Search ............................... 340/694-696,
340/32, 34, 52 R, 62, 147 R, 147 F, 148, 539,
384 E, 825.69, 825.72, 825.7, 825.76, 825.39;
307/10 R, 9; 116/56, 57, 37, DIG. 29, DIG. 30,
DIG. 31; 180/170, 79, 79.1, 137; 181/114;
358/194.1; 367/137; 455/95, 99, 603

[56] References Cited

U.S. PATENT DOCUMENTS

| | | | |
|---|---|---|---|
| 3,539,819 | 11/1970 | Parisoe | 340/694 |
| 3,949,297 | 4/1976 | Hideshima | 340/695 |
| 4,085,403 | 4/1978 | Meier et al. | 340/10 R |
| 4,114,099 | 9/1978 | Hollander | 340/695 |
| 4,232,231 | 11/1980 | Reed | 307/10 R |

Primary Examiner—Donnie Lee Crosland
Attorney, Agent, or Firm—Cushman, Darby & Cushman

[57] ABSTRACT

The remote control switch apparatus has an instruction switch provided on a steering wheel to project toward the inside of a passenger compartment away from an instrument panel of the car so as to indicate a driving condition. A transmitter is installed at the steering wheel to generate a radio wave signal or radiation signal in response to the instruction switch and a receiver, provided on the instrument panel, receives the radiation signal and generates a control signal.

3 Claims, 3 Drawing Figures

REMOTE CONTROL SWITCH APPARATUS FOR AUTOMOBILES

BACKGROUND OF THE INVENTION

This invention relates to a switch apparatus for automobiles suitable for use in, for example, setting, releasing and so on of a constant speed driving control apparatus.

In general, such switches for automobiles are a horn switch provided on the top surface of the steering wheel, switches on a steering column (outer cover portion of the steering support) and switches on the instrument panel. However, it is desirable that the switches be operated while the car is being driven, such as those for the constant speed driving apparatus, can be operated by the driver's hand which touches and operates the steering wheel, and that the switches are provided at a position where they can be seen in a moment.

SUMMARY OF THE INVENTION

It is an object of the invention to provide a switch apparatus for automobiles which meets the above requirements.

It is another object of the invention to provide a switch apparatus for automobiles which can be installed without use of additional electrical wiring.

In order to achieve the above objects, the apparatus of the invention is formed such that electrical switches are provided on the top surface of a movable steeing wheel and the signals from the switches are transmitted on a radio wave signal or radiation signal to a fixed member in the trim of the passenger compartment.

Moreover, electrical power is fed to the electrical switches and the signal transmitter by making use of the conventionally provided horn switch, with a simpler wiring being expected.

DESCRIPTION OF THE PREFERRED EMBODIMENT

Figure 1:
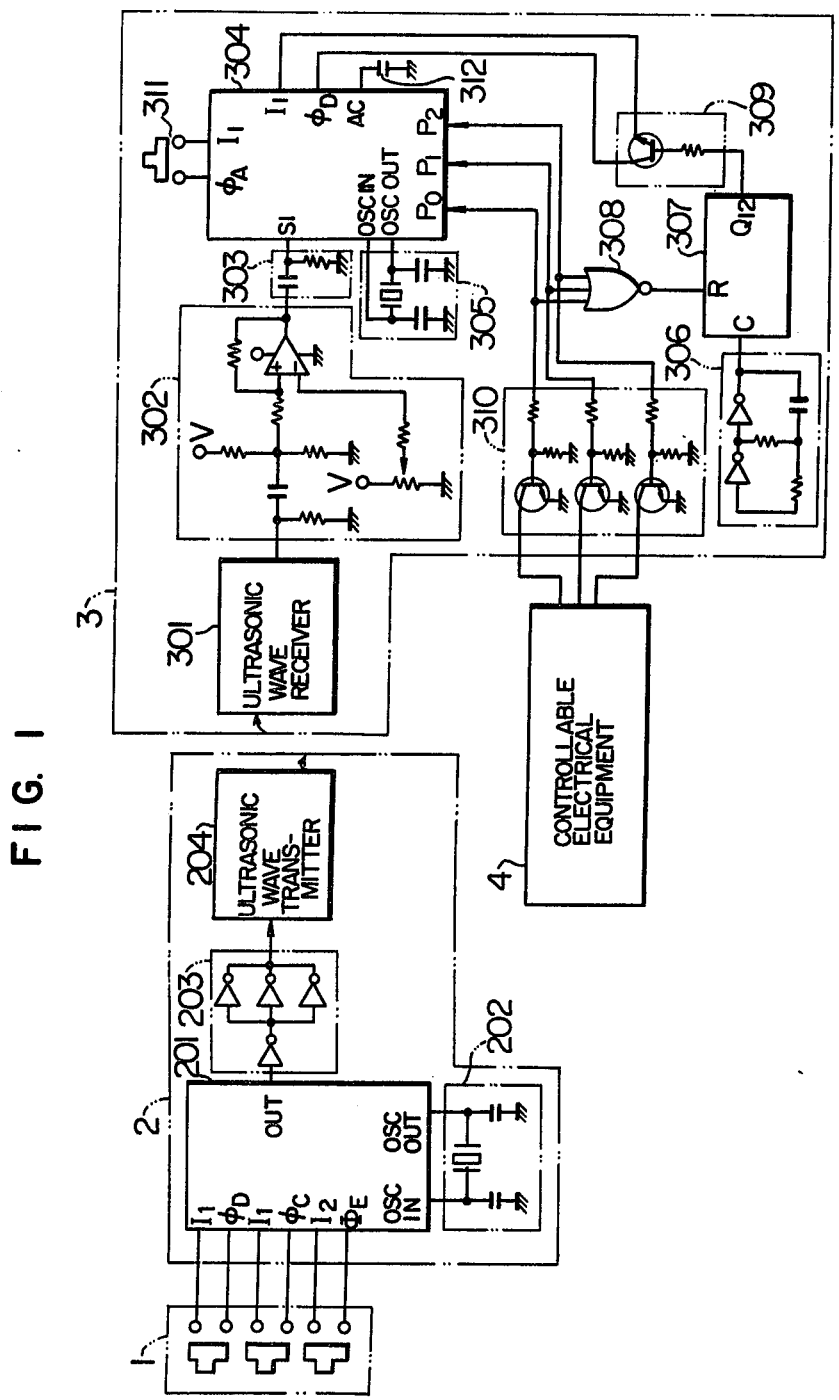
FIG. 1 is an electrical connection diagram of one embodiment of the switch apparatus according to the invention.

One embodiment of the invention will be described hereinafter with reference to the accompanying drawings. Referring to the electrical connection diagram of the whole arrangement of FIG. 1, there are shown plural switches of a driving condition setting switch 1, and a transmitter 2, which includes an integrated circuit 201 for remotely controlling the transmitter (M58480, made by the Mitsubishi Electric Co.) a discrete ceramic resonator circuit 202 for generating a reference oscillation, a buffer circuit 203 (four CD4049 circuits made by RCA) and an ultrasonic wave transmitter 204 (EFR-OTB40K2, made by the Matsushita Electronic Component Co.). A signal from the setting switch 1 in response to operation thereof is applied to the integrated circuit 201 in the transmitter 2. This circuit 201 then produces a single-line multiplex communication signal such as a serial multiplex signal corresponding to the operation status of the switch of the setting switch 1, depending on the reference oscillation signal from the discrete ceramic resonator circuit 202, and supplies it through the buffer circuit 203 to the ultrasonic transmitter 204. The ultrasonic transmitter 204 emits this single-line multiplex communication signal as an ultrasonic wave.

The ultrasonic wave signal emitted from the transmitter 2 is received by an ultrasonic wave receiver 301 (RTB40K2, made by the Matsushita Electronic Component Co.) in a receiver 3, and converted to the associated electrical signal. The electrical signal from the ultrasonic wave receiver 301 is applied through a waveform shaping circuit 302 having an AC coupling capacitor and a comparator, and through an input circuit 303 of an AC coupling capacitor, to an integrated circuit 304 for a remotely controlled receiver (M58481, made by the Mitsubishi Electric Co.). This integrated circuit 304 is responsive to the single-line multiplex communication signal to produce parallel signals at terminals $P_0$, $P_1$ and $P_2$ by the application of a reference oscillation signal from a discrete ceramic resonator circuit 305. The signals appearing at the terminals $P_0$, $P_1$ and $P_2$ become high "H" level by closing the respective switches of the setting switch 1, but are not released to the low "L" level by opening the respective switches thereof. Therefore, the combination of a CR oscillation circuit 306, a binary frequency dividing circuit (CD4040, made by RCA) 307, a 3-input NOR gate 308 and a transistor switching circuit 309 is used to prevent the above situation. That is, when any one of the terminals $P_0$, $P_1$ and $P_2$ becomes high, "H" level, the switching circuit 309 makes a short circuit between terminals $I_1$ and $\phi_D$ of the integrated circuit 304, and thereby after a certain time, changes this signal from the "H" level to "L" level. Reference numeral 310 represents a transistor switching circuit for converting the signals produced at the terminals $P_0$, $P_1$ and $P_2$ to switching signals, 311 an operation switch of the receiver 3, and 312 a capacitor for automatic resetting upon turning on of power supply.

Reference numeral 4 designates an electrical equipment such as a constant speed running control apparatus or the like for being responsive to a signal which is associated with the setting switch 1 and generated from the receiver 3.

Figure 2:
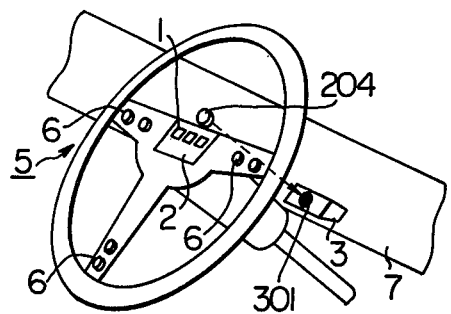
FIG. 2 is a perspective view of the arrangement of components in the embodiment.

FIG. 2 shows the arrangement of the respective blocks in this embodiment. On the panel of the transmitter 2 is disposed the setting switch 1, above which is located the ultrasonic transmitter 204 to emit an ultrasonic signal toward the instrument panel surface. The setting switch 1 and the transmitter 2 are installed around the center of a rotatable steering wheel 5. Reference numeral 6 represents a horn switch. In addition, the receiver 3 spaced from and located behind the ultrasonic receiver 301 opposing the ultrasonic wave transmitter 204 is disposed on an instrument panel 7 in front of the steering wheel 5.

Figure 3:
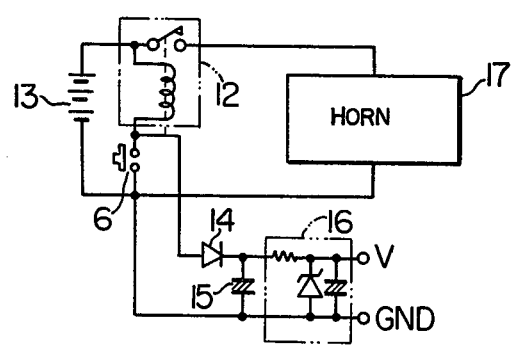
FIG. 3 is an electrical connection diagram of the power supply circuit for a transmitter 2 as shown in FIG. 1.

FIG. 3 is an electrical connection diagram of the power supply circuit of the transmitter 2. When the horn switch 6 is opened, a battery 13 in the car supplies current through the terminals of a horn relay 12 of the horn switch 6 and through a diode 14 to a capacitor 15 to charge the capacitor 15. The voltage across the capacitor 15 is supplied via a Zener diode constant voltage circuit 16 to the transmitter 2 as a constant voltage. Therefore, even though the horn switch 6 is closed, the accumulated charge in the capacitor 15 enables the transmitter 2 to operate. Numeral 17 denotes a horn which is activated by the closure of the switch 6.

As will be obvious from the above description, when the setting switch 1 located on the steering wheel 5 is operated, an ultrasonic wave signal emitted from the transmitter 2 is received by the receiver 3 and applied to the electrical equipment 4 as an electrical signal associated with the operation of the setting switch 1. If the transmitter 2 is separated several tens of centimeters from the receiver 3, a directivity of several tens of degrees can be obtained. So the transmission of the signal therebetween is possible even under a certain amount of angular movement of the steering wheel 5.

While ultrasonic waves are used for the wireless transmitting and receiving system as described above, any coupling means such as a photo coupler of a light emitting diode and a photo transistor, and a magnetic coupling means may be utilized unless wireless transmission and reception is possible. Moreover, the number of receiving elements may be increased for widening the directivity or transmissible space range as necessary.

Thus, since the apparatus of the invention has the switch provided on the steering wheel, not on the instrument panel as seen in the prior art, the driver can readily operate the switch without stretching his hand thereto.

We claim:

1. A remote control switch apparatus for changing the driving condition of a car including a steering wheel said steering wheel including a horn switch for selectively completing a current path to actuate a horn, said steering wheel being rotatably mounted relative to both a nonmovable outer cover portion thereof and an instrument panel, said apparatus comprising:
   at least one instruction switch for mounting on said steering wheel to project toward the inside of the passenger compartment of a car away from said instrument panel of the car so as to specify a driving condition;
   an ultrasonic wave transmitter for mounting on said steering wheel and for generating an ultrasonic signal associated with said instruction switch; power supply means, comprising a diode and a capacitor connected across said horn switch, for providing power to said transmitter; and
   an ultrasonic wave receiver for mounting on one of said instrument panel and said nonmovable outer cover portion of said steering wheel to oppose said transmitter and for generating a control signal corresponding to said ultrasonic signal when said transmitter and receiver are within a predetermined degree of alignment.

2. A remote control switch apparatus for changing the driving condition of a car including a steering wheel said steering wheel including a horn switch for selectively completing a current path to actuate a horn, said steering wheel being rotatably mounted relative to both a nonmovable outer cover portion thereof and an instrument panel, said apparatus comprising:
   a plurality of instruction switches for mounting on said steering wheel to project toward the inside of a passenger compartment away from said instrument panel of the car so as to specify a driving condition;
   an ultrasonic wave transmitter for mounting on said steering wheel and which includes a first reference frequency oscillation circuit, a circuit for generating a single-line multiplex communication signal in response to both said oscillation circuit and to the operation of any one of said switches and means for converting said communication signal to an ultrasonic signal; power supply means, comprising a diode and a capacitor connected across said horn switch, for providing power to said transmitter; and
   an ultrasonic receiver for mounting on said instrument panel and which includes receiving means for receiving said ultrasonic signal and producing an output signal when said transmitter and receiver are within a predetermined degree of alignment, means for shaping the waveform of said output signal, second and third reference frequency signal generating means, signal converting means having a plurality of control output terminals corresponding to the instruction switches and responsive to said waveform-shaped output and the second reference frequency signal to generate a control output to the corresponding control output terminal, and means for resetting, in response to said third reference frequency signal and the control output, said signal converting means after a predetermined time.

3. An apparatus for remotely controlling the operation of an electric equipment mounted on an automotive vehicle having a storage battery, a horn, an instrument panel and a steering wheel rotatably mounted relative to said instrument panel on which a horn switch having a horn relay coil is provided to enable said horn to be activated by said storage battery upon activation thereof, said apparatus comprising:
   a power supply circuit, provided on said steering wheel comprising a series connected diode and capacitor electrically connected across said horn switch, such that said capacitor is charged by said storage battery during the deactivation of said horn switch through said relay coil;
   second switch means provided on said steering wheel;
   transmitter means provided on said steering wheel and electrically connected to said power supply circuit and said second switch means for transmitting an ultrasonic wave signal in response to the activation of said second switch means; and
   receiver means provided on said instrument panel, electrically disconnected from said transmitter means and electrically connected to said electric equipment for receiving said ultrasonic wave signal and controlling the operation of said electric equipment in response to the received ultrasonic wave signal when said transmitter and receiver are within a predetermined degree of alignment.

* * * * *